United States Patent
Bowman et al.

(10) Patent No.: US 6,419,325 B1
(45) Date of Patent: Jul. 16, 2002

(54) WHEEL BEARING ARRANGEMENT FOR A DUAL WHEEL ASSEMBLY

(75) Inventors: Larry W. Bowman, Troy; Patrick D. Laper, Rochester; Raji S. El-Kassouf, Sterling Heights; Michael G. Semke, Novi; Richard M. Clisch, Canton; Gary P. Ford, Rochester, all of MI (US); Joseph B. Saxon, Cookeville, TN (US)

(73) Assignee: Meritor Heavy Vehicle Systems, LLC, Troy, MI (US)

( * ) Notice: Subject to any disclaimer, the term of this patent is extended or adjusted under 35 U.S.C. 154(b) by 0 days.

(21) Appl. No.: 09/528,386

(22) Filed: Mar. 20, 2000

(51) Int. Cl.[7] .................................................. B60B 11/02
(52) U.S. Cl. ...................................... 301/36.2; 301/36.1
(58) Field of Search ................................ 301/36.1, 36.2, 301/36.3, 137; 384/903, 540

(56) References Cited

U.S. PATENT DOCUMENTS

| | | |
|---|---|---|
| 1,994,719 A | 3/1935 | Lichty |
| 2,136,125 A * | 11/1938 | Delaval-Crow ......... 384/903 X |
| 2,142,787 A | 1/1939 | Higbee |
| 2,154,497 A | 4/1939 | Durham |
| 2,182,560 A | 12/1939 | Higbee |
| 2,206,216 A | 7/1940 | Ash |
| 2,210,572 A | 8/1940 | Durham |
| 2,214,457 A | 9/1940 | Durham |
| 2,239,674 A | 4/1941 | Frederickson |
| 2,252,205 A | 8/1941 | Reynolds |
| 2,270,918 A | 1/1942 | Ash |
| 2,298,333 A | 10/1942 | Ash et al. |
| 2,303,599 A | 12/1942 | Ash |
| 2,305,836 A | 12/1942 | Ash |
| 2,343,129 A | 2/1944 | Ash |
| 2,357,343 A | 9/1944 | Morgan |
| 2,441,807 A | 5/1948 | Francis |
| 2,459,347 A * | 1/1949 | Tolman ...................... 301/36.2 |
| 2,482,824 A * | 9/1949 | Alden ........................ 301/36.2 |
| 2,569,861 A | 10/1951 | Moore et al. |
| 2,576,258 A | 11/1951 | Marsh |
| 2,988,400 A | 6/1961 | Ash |
| 4,138,168 A * | 2/1979 | Herlitzek ................ 384/903 X |
| 5,971,621 A * | 10/1999 | Oyafuso et al. ........ 384/903 X |

FOREIGN PATENT DOCUMENTS

AT 31211 * 12/1907 ................ 301/36.1

OTHER PUBLICATIONS

Meritor Drawing 5–64506, Jul. 6, 1998.

* cited by examiner

Primary Examiner—Joseph D. Pape
Assistant Examiner—Patricia Engle
(74) Attorney, Agent, or Firm—Carlson, Gaskey & Olds

(57) ABSTRACT

A dual wheel assembly for a vehicle is provided that includes an axle assembly having an axle shaft disposed therein, which defines an axis. First and second wheel hubs are supported on outboard and inboard portions, respectively of the axle assembly. The first wheel hub is coupled to the axle shaft so that the first wheel hub may be driven about the axis and the second wheel hub is rotatable about the axis relative to the first wheel hub. A first bearing assembly is interposed between the first wheel hub and the outboard portion for supporting the first wheel hub on the outboard portion. The outboard portion has a first shoulder with the first bearing assembly abutting the first shoulder. Similarly, a second bearing assembly is interposed between the second wheel hub and the inboard portion for supporting the second wheel hub on the inboard portion, and the inboard portion has a second shoulder with the second bearing assembly abutting the second shoulder. Securing members are attached to the axle assembly opposite each shoulder to retain the bearing assemblies and wheel hubs on the axle assembly. In this manner, the wheel hubs may be more easily installed and removed as units independently of one another.

13 Claims, 2 Drawing Sheets

WHEEL BEARING ARRANGEMENT FOR A DUAL WHEEL ASSEMBLY

BACKGROUND OF THE INVENTION

The invention relates to an axle assembly having multiple wheels at each end of an axle housing, and more specifically, the invention relates to a bearing arrangement for dual wheel assemblies in which one wheel is permitted to rotate relative to the other wheel.

Axle assemblies having dual wheels on either end of the axle have been used to increase the load bearing capability of heavy duty vehicles. Typically the pair of wheels on each end of the axle assembly are secured together so that they rotate together about an axis. Some heavy duty vehicles, such as lift trucks, undergo numerous turning maneuvers which wear the tires significantly. The tire wear is caused when the tires scrub, or drag, since the wheels that are secured together must travel different distances at the inside and outside of the turning radius. Tire wear and maintenance on heavy duty lift trucks due to scrub cost thousands of dollars annually per vehicle.

Dual wheel assembly designs have been proposed that permit the wheels to rotate relative to one another. Many designs have been developed which utilize a gear set between the wheels. As a result, very complex wheel bearing arrangements have been used which makes installation and removal of the wheels difficult. If only the outer wheel needs to be removed for repair, for example, both wheels and their associated bearing assemblies may need to be removed. That is, the wheel bearing arrangement for one wheel is not independent from the wheel bearing arrangement for the other wheel. Therefore, what is needed is a wheel bearing arrangement for a dual wheel assembly that is more modular which allows easy installation and removal of each wheel.

SUMMARY OF THE INVENTION AND ADVANTAGES

The present invention provides a dual wheel assembly for a vehicle that includes an axle assembly having an axle shaft disposed therein which defines an axis. The axle assembly has an inboard portion and an outboard portion adjacent to the inboard portion proximate to a terminal end of the axle assembly. First and second wheel hubs are supported on the outboard and the inboard portions, respectively. The first wheel hub is coupled to the axle shaft so that the first wheel hub may be driven about the axis. The second wheel hub is rotatable about the axis relative to the first wheel hub. In this manner, tire scrub is reduced since the wheel hubs may rotate at different speeds, and different directions if necessary.

A first bearing assembly is interposed between the first wheel hub and the outboard portion for supporting the first wheel hub on the outboard portion. The outboard portion has a first shoulder with the first bearing assembly abutting the first shoulder. Similarly, a second bearing assembly is interposed between the second wheel hub and the inboard portion for supporting the second wheel hub on the inboard portion, and the inboard portion has a second shoulder with the second bearing assembly abutting the second shoulder. First and second securing members are attached to the axle assembly and are adjacent to the first and the second bearing assemblies, respectively, opposite the first and the second shoulders, respectively. The first and second securing members retain the bearing assemblies against the shoulders and retain the first and the second wheel hubs on the outboard and the inboard portions, respectively. In this manner, the wheel hubs may be more easily installed and removed as units.

Accordingly, the above invention provides a wheel bearing arrangement for a dual wheel assembly that is more modular which allows easy installation and removal of each wheel.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENT

Figure 1:
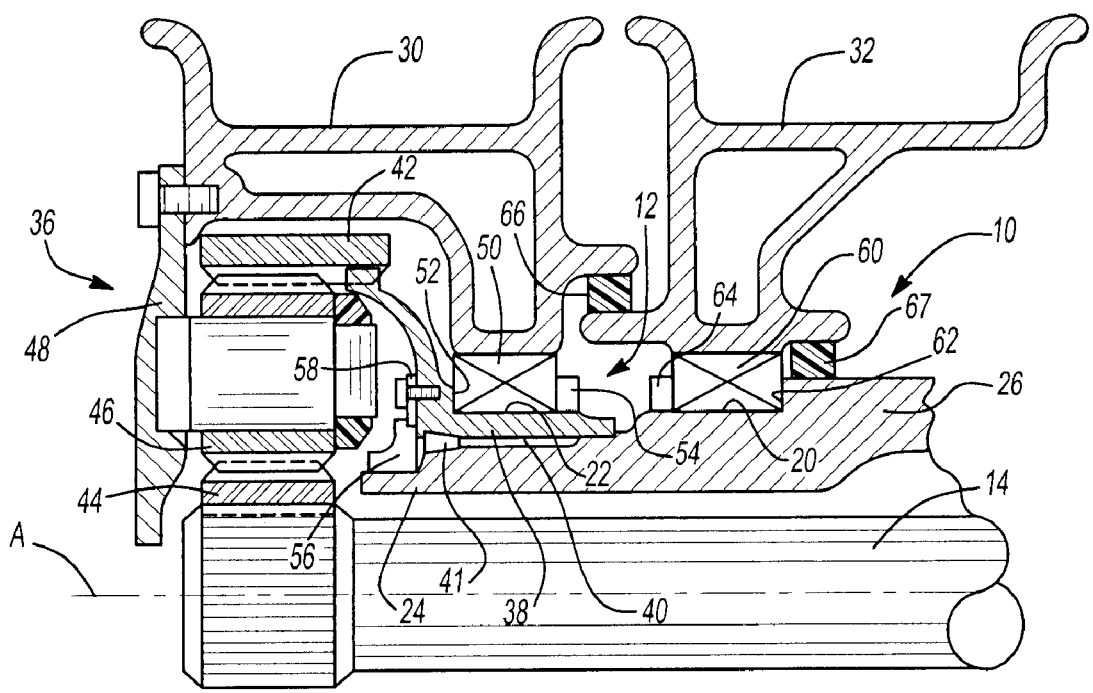
FIG. 1 is a cross-sectional view of a dual wheel assembly of the present invention with the wheel bearings shown schematically.

A dual wheel assembly 10 for a vehicle is shown in FIG. 1. The dual wheel assembly 10 includes an axle assembly 12 having an axle shaft 14 disposed therein, which defines a rotational axis A. The axle assembly 12 has an inboard portion 20 and an outboard portion 22 adjacent to the inboard portion 20 and proximate to a terminal end 24 of the axle assembly 12. The axle assembly 12 includes an axle housing 26 that defines the inboard portion 20. The outboard portion 22 may be defined by the axle housing 26 or by an support member, which is discussed in more detail below. The inboard portion 20 has inboard diameter that is larger than the diameter of the terminal end 24, which facilitates ease of assembly which will be appreciated from the discussion below.

First 30 and second 32 wheel hubs are supported on the outboard 22 and the inboard 20 portions, respectively. The first wheel hub 30 is coupled to the axle shaft 14 for being driven by a drive mechanism about the axis A. The second wheel hub 32 is rotatable about the axis A relative to the first wheel hub 30, preferably without a mechanical coupling, such as a gear set, between them. That is, the second wheel 32 is undriven and free to rotate independently of the first hub 30. Since lift trucks have high torque requirements at the wheels, the dual wheel assembly 10 further includes a planetary gear set 36 mechanically interconnecting the axle shaft 14 and the first wheel hub 30, in a manner known in the art, for providing torque multiplication to the first wheel hub 30.

The planetary gear set 36 includes a removable ring gear support 38 splined to a portion 40 of the axle housing 36 to prevent rotation about the axis A. A brass bushing 41 is arranged between the terminal end 24 and the ring gear support 38. An outer cylindrical surface of the ring gear support 38 forms the outboard portion 22. If a planetary gear set 36 is not used, the portion 40 of the axle housing 26 may form the outboard portion 22. A ring gear 42 is arranged on the ring gear support 38, and a sun gear 44 is splined to the axle shaft 14. Planetary gears 46 are supported by a cover 48 and are arranged between the sun gear 44 and the ring gear 44. In this manner, the axle shaft 14 drives the first hub 30 through the planetary gear set 36 to achieve a multiplication of torque at the first hub 30.

A first bearing assembly 50, shown schematically in FIG. 1, is interposed between the first wheel hub 30 and the outboard portion 22 for rotationally supporting the first wheel hub 30 thereon. The outboard portion 22 has a first shoulder 52 that the first bearing assembly 50 abuts to axially locate the first bearing assembly 50. A first securing member 54, preferably a nut, is secured to the ring gear support 38 adjacent to the first bearing assembly 50 and opposite the first shoulder 52 to securely retain the first bearing assembly 50 in an axial position. Another nut 56 fastened to the terminal end 24 secures the ring gear support 38 and first wheel hub 30 to the axle housing 26. A keeper 58 coacts with the nut 56 to prevent the nut 56 from loosening from the terminal end 24. If a planetary gear set 36 is not used, the first bearing assembly 50 may be interposed between the portion 40 and the first wheel hub 30 so that the first wheel hub 30 is supported directly on the axle housing 26. In this arrangement, the diameter of the portion 40 is smaller than the diameter of the inboard portion 20 so that the second wheel hub 32 may be easily installed and removed, as discussed below.

A second bearing assembly 60, shown schematically in FIG. 1, is interposed between the second wheel hub 32 and the inboard portion 20 for rotationally supporting the second wheel hub 32 thereon. The inboard portion 20 has a second shoulder 62 with the second bearing assembly 60 abutting the second shoulder 62 to axially locate the second bearing assembly 60. A second securing member 64, preferably a nut, is secured to the inboard portion 20 adjacent to the second bearing assembly 60 and opposite the second shoulder 62 to securely retain the second bearing assembly 60 in an axial position along the axle housing 26. Unlike prior art wheel bearing arrangements, the wheel bearing assembly for the innermost wheel is secured independently of the outermost wheel. That is, the pre-load of the outer bearing assembly does not affect the inner bearing assembly. In this manner, the first wheel hub 30 may be installed and removed as a unit without affecting the second wheel hub 32.

Seals 66, 67 are arranged between the first 30 and second 32 wheel hubs and the second wheel hub 32 and axle housing 26, respectively, to seal the bearing area and prevent contaminants from penetrating the bearing assemblies 50, 60.

Detailed embodiments of the first 50 and second 60 bearing assemblies are shown in FIGS. 2 through 5, although bearing assemblies other than the type shown may be used. For example, a suitable ball bearing assembly may be used. The first 30 and second 32 wheel hubs each include a third shoulder 68 with each of the bearing assemblies 50, 60 abutting the respective third shoulder 68 to axially locate the bearing assemblies 50, 60 relative to the wheel hubs 30, 32. The bearing assemblies 50, 60 typically must be axially located wheel hubs 30, 32 in addition to axially locating the bearing assemblies 50, 60 relative to the outboard 22 and inboard 20 portions to ensure that the wheel hubs 30, 32 do not shift relative to the axle housing 26.

Figure 2:
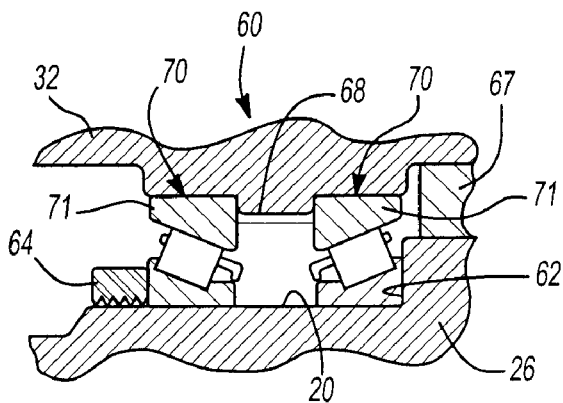
FIG. 2 is an enlarged view of one wheel bearing arrangement of the present invention.
Figure 3:
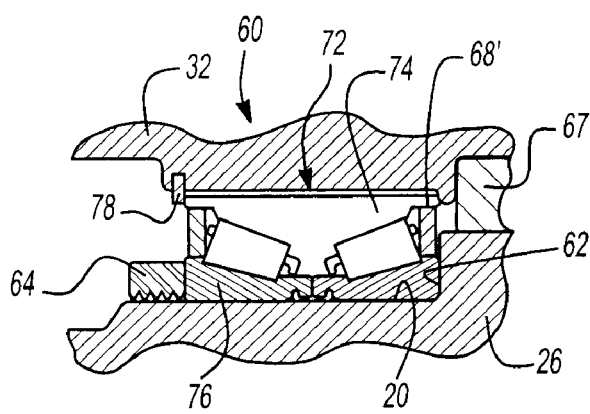
FIG. 3 is an enlarged view of another wheel bearing arrangement of the present invention.
Figure 4:
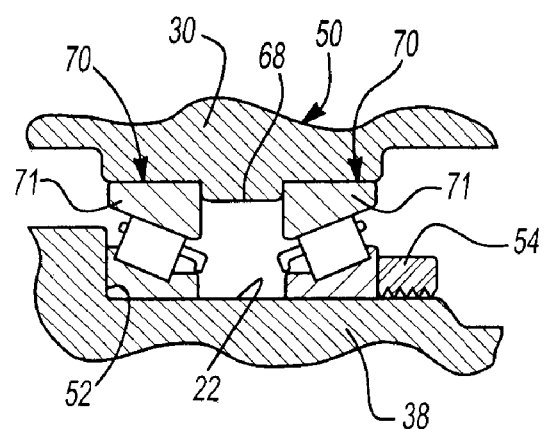
FIG. 4 is an enlarged view of the wheel bearing arrangement of FIG. 2 arranged in the other hub.
Figure 5:
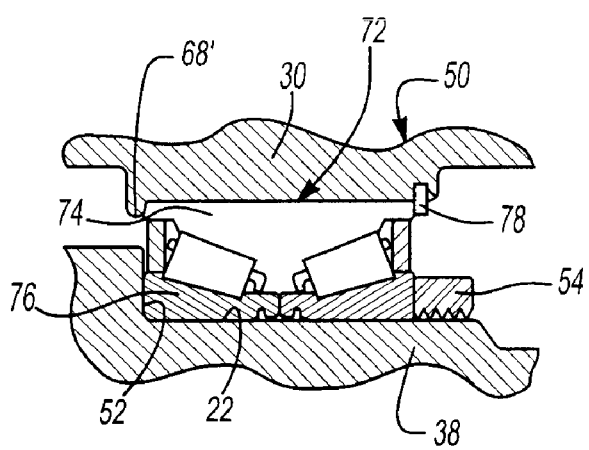
FIG. 5 is an enlarged view of the wheel bearing arrangement of FIG. 4 arranged in the other hub.

In one embodiment shown in FIG. 2 and FIG. 4, the first 50 and second 60 bearing assemblies each comprise a pair of spaced apart roller bearing assemblies 70, as well known in the art, with the third shoulder 68 interposed between the roller bearing assemblies 70. In this manner, the outer races 71 of the bearing assemblies 70 abut the third shoulder to axially locate the bearing assemblies 70 relative to the second wheel hub. In another embodiment shown in FIG. 3 and FIG. 5, the first 50 and second 60 bearing assemblies each comprise a unitized bearing assembly 72 with the outer race 74 abutting the third shoulder 68 and the inner race 76 abutting the second shoulder 62 and the nut 64. Typically, a retainer 78 is used to abut each of the unitized bearing assemblies 72 opposite the respective third shoulder 68 for locating the bearing assemblies 72 relative to its respective wheel hub.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A dual wheel assembly for a vehicle, said assembly comprising:

an axle assembly having an axle shaft disposed therein defining an axis, said axle assembly have an inboard portion and an outboard portion adjacent to said inboard portion proximate to a terminal end of said axle assembly;

first and second wheel hubs supported on said outboard and said inboard portions, respectively, said first wheel hub coupled to said axle shaft for being driven about said axis, and said second wheel hub rotatable about said axis relative to said first wheel hub;

a first bearing assembly interposed between said first wheel hub and said outboard portion for supporting said first wheel hub on said outboard portion, said outboard portion having a first shoulder with said first bearing assembly abutting said first shoulder;

a second bearing assembly interposed between said second wheel hub and said inboard portion for supporting said second wheel hub on said inboard portion, said inboard portion having a second shoulder with said second bearing assembly abutting said second shoulder; and first and second internally threaded securing members attached to said axle assembly and abut said first and said second bearing assemblies, respectively, opposite said first and said second shoulders, respectively, to retain said bearing assemblies against said shoulders and retain said first and said second wheel hubs on said outboard and said inboard portions, respectively.

2. The dual wheel assembly according to claim 1, wherein said first and said second securing members abut said first and said second bearing assemblies, respectively.

3. The dual wheel assembly according to claim 1, wherein said first and said second hubs each include a third shoulder with each of said bearing assemblies abutting said respective third shoulder.

4. The dual wheel assembly according to claim 1, wherein said second wheel hub is undriven.

5. The dual wheel assembly according to claim 1, wherein said inboard portion has inboard diameter and said terminal end has a terminal end diameter smaller than said inboard diameter.

6. A dual wheel assembly for a vehicle, said assembly comprising:

an axle assembly having an axle shaft disposed therein defining an axis, said axle assembly have an inboard portion and an outboard portion adjacent to said inboard portion proximate to a terminal end of said axle assembly;

first and second wheel hubs supported on said outboard and said inboard portions, respectively, said first wheel hub coupled to said axle shaft for being driven about said axis, and said second wheel hub rotatable about said axis relative to said first wheel hub;

a first bearing assembly interposed between said first wheel hub and said outboard portion for supporting said first wheel hub on said outboard portion, said outboard portion having a first shoulder with said first bearing assembly abutting said first shoulder;

a second bearing assembly interposed between said second wheel hub and said inboard portion for supporting said second wheel hub on said inboard portion, said inboard portion having a second shoulder with said second bearing assembly abutting said second shoulder;

first and second securing members attached to said axle assembly and adjacent to said first and said second bearing assemblies, respectively, opposite said first and said second shoulders, respectively, to retain said bearing assemblies against said shoulders and retain said first and said second wheel hubs on said outboard and said inboard portions, respectively; and wherein said dual wheel assembly further includes a planetary gear set mechanically interconnecting said axle shaft and said first wheel hub for providing torque multiplication to said first wheel hub.

7. The dual wheel assembly according to claim 6, wherein said axle assembly includes an axle housing having said inboard portion, and said planetary gear set includes a removable ring gear support secured on said axle housing and forming said outboard portion.

8. The dual wheel assembly according to claim 7, wherein said first aid said second securing members abut said first and said second bearing assemblies, respectively.

9. The dual wheel assembly according to claim 8, wherein said securing members comprise internally threaded fasteners.

10. The dual wheel assembly according to claim 7, wherein said dual wheel assembly further includes a third securing member attached to said axle housing adjacent to said ring gear support to retain said ring gear support thereon.

11. A dual wheel assembly for a vehicle, said assembly comprising:

an axle assembly having an axle shaft disposed therein defining an axis, said axle assembly have an inboard portion and an outboard portion adjacent to said inboard portion proximate to a terminal end of said axle assembly;

first and second wheel hubs supported on said outboard and said inboard portions, respectively, said first wheel hub coupled to said axle shaft for being driven about said axis, and said second wheel hub rotatable about said axis relative to said first wheel hub;

a first bearing assembly interposed between said first wheel hub and said outboard portion for supporting said first wheel hub on said outboard portion, said outboard portion having a first shoulder with said first bearing assembly abutting said first shoulder;

a second bearing assembly interposed between said second wheel hub and said inboard portion for supporting said second wheel hub on said inboard portion, said inboard portion having a second shoulder with said second bearing assembly abutting said second shoulder;

first and second securing members attached to said axle assembly and adjacent to said first and said second bearing assemblies, respectively, opposite said first and said second shoulders, respectively, to retain said bearing assemblies against said shoulders and retain said first and said second wheel hubs on said outboard and said inboard portions, respectively; and wherein said first and said second hubs each include a third shoulder with each of said bearing assemblies abutting said respective third shoulder, and wherein said first and said second bearing assemblies each comprise a unitized bearing assembly including a pair of inner races secured to one another each having a set of roller bearing elements and a common outer race with a pair of spaced apart seals arranged between said inner and outer races enclosing said sets of roller bearing elements, and a retainer abutting each of said first and second bearing assemblies opposite said respective third shoulder for locating said first and second bearing assemblies relative to said wheel hubs.

12. A dual wheel assembly for a vehicle, said assembly comprising:

an axle assembly having an axle shaft disposed therein defining an axis, said axle assembly have an inboard portion and an outboard portion adjacent to said inboard portion proximate to a terminal end of said axle assembly;

first and second wheel hubs supported on said outboard and said inboard portions, respectively, said first wheel hub coupled to said axle shaft for being driven about said axis, and said second wheel hub rotatable about said axis relative to said first wheel hub;

a first bearing assembly interposed between said first wheel hub and said outboard portion for supporting said first wheel hub on said outboard portion, said outboard portion having a first shoulder with said first bearing assembly abutting said first shoulder;

a second bearing assembly interposed between said second wheel hub and said inboard portion for supporting said second wheel hub on said inboard portion, said inboard portion having a second shoulder with said second bearing assembly abutting said second shoulder;

first and second securing members attached to said axle assembly and adjacent to said first and said second bearing assemblies, respectively, opposite said first and said second shoulders, respectively, to retain said bearing assemblies against said shoulders and retain said first and said second wheel hubs on said outboard and said inboard portions, respectively; and wherein said first and said second hubs each include a third shoulder with each of said bearing assemblies abutting said respective third shoulder.

13. The dual wheel assembly according to claim 12 wherein said first and said second bearing assemblies each comprise a pair of spaced apart roller bearing assemblies with said third shoulder interposed between said roller bearing assemblies.

* * * * *

UNITED STATES PATENT AND TRADEMARK OFFICE
CERTIFICATE OF CORRECTION

PATENT NO.   : 6,419,325 B1
DATED        : July 16, 2002
INVENTOR(S)  : Bowman et al.

It is certified that error appears in the above-identified patent and that said Letters Patent is hereby corrected as shown below:

<u>Title page,</u>
Item [75], Inventors: "Raji S. El-Kassouf" should be -- Raji S. El-kassouf --

<u>Column 5,</u>
Line 31, "aid" should be -- and --

Signed and Sealed this

Nineteenth Day of November, 2002

Attest:

Attesting Officer

JAMES E. ROGAN
*Director of the United States Patent and Trademark Office*